E. W. GERRISH.
METHOD OF UTILIZING SCRAP PIECES OF MATERIAL.
APPLICATION FILED APR. 6, 1914.

Patented Aug. 3, 1915.

Witnesses:

Inventor:
Edward W. Gerrish,
by Walter E. Lombard,
Atty.

UNITED STATES PATENT OFFICE.

EDWARD W. GERRISH, OF LYNN, MASSACHUSETTS.

METHOD OF UTILIZING SCRAP PIECES OF MATERIAL.

1,148,584.　　　　　Specification of Letters Patent.　　Patented Aug. 3, 1915.

Application filed April 6, 1914. Serial No. 830,080.

*To all whom it may concern:*

Be it known that I, EDWARD W. GERRISH, a citizen of the United States of America, and a resident of Lynn, in the county of Essex and State of Massachusetts, have invented certain new and useful Improvements in Methods of Utilizing Scrap Pieces of Material, of which the following is a specification.

This invention relates to an improved method of utilizing scrap pieces of material.

The invention consists primarily in taking scrap pieces of leather or similar material and mortising the edges thereof, then interlocking said mortised edges with an adhesive in a tacky condition applied thereto, subjecting the united pieces to roller pressure, then providing one surface of said united pieces with a thin facing of leather or some similar material, and then cutting therefrom blanks such as soles and heel taps for use in the manufacture of boots and shoes.

Figure 1:
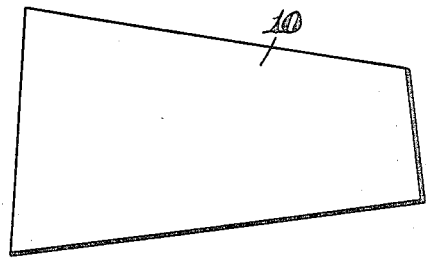
Figure 2:
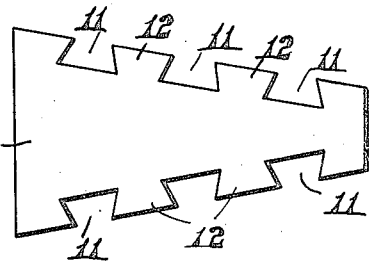
Figure 3:
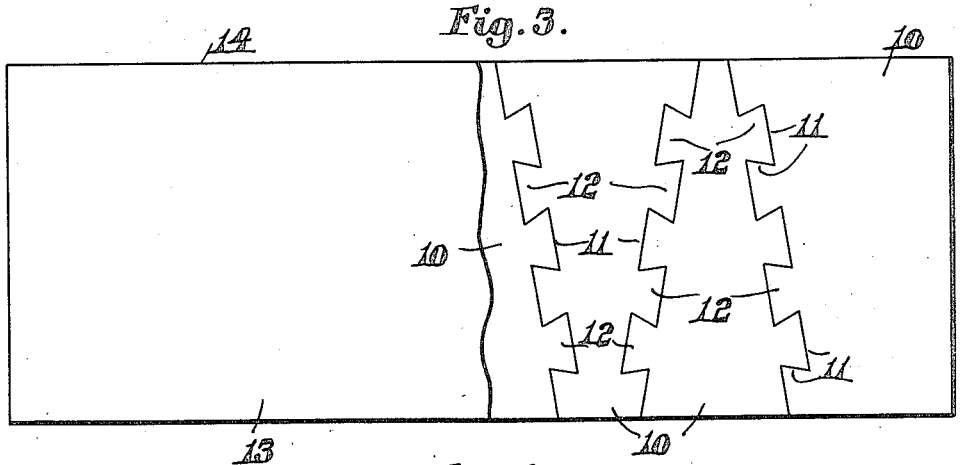
Figure 4:
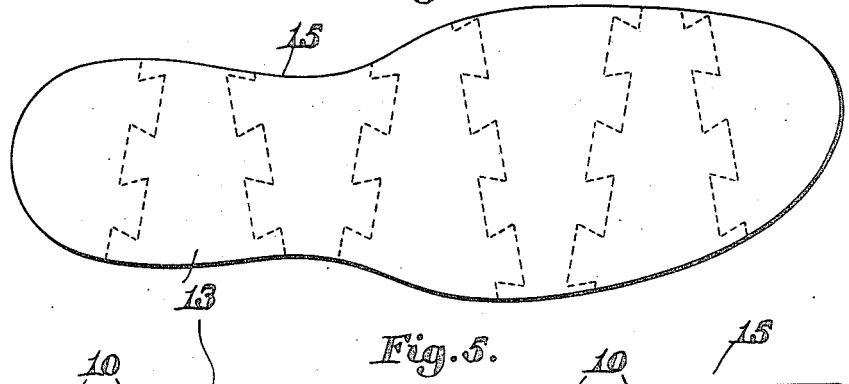
Figure 5:
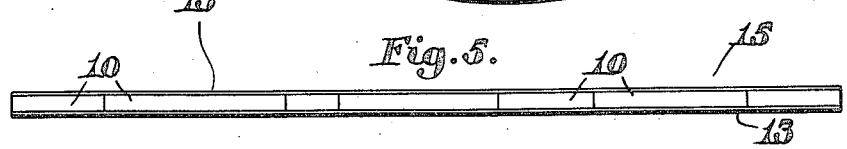

Of the drawings: Figure 1 represents a piece of leather or some similar material. Fig. 2 represents the same piece with two edges thereof mortised. Fig. 3 represents a plan of a blank formed of several mortised pieces interlocked and showing a piece of facing material applied to a portion of one face thereof. Fig. 4 represents a plan of a shoe sole cut from said blank, and Fig. 5 represents an elevation of the same.

Similar characters designate like parts throughout the several figures of the drawings.

In the drawings, 10 is a piece of leather or similar material of irregular shape and too small to be utilized by itself in the manufacture of boots and shoes. In every shoe factory there are innumerable pieces of such material which at the present time are of very little value as no means has been found whereby they may be used to advantage. If these pieces could be successfully united a great saving would be made in the manufacture of boots and shoes for the pieces of material are as well adapted for inner lifts of heels and slip taps for soles as lifts and taps formed integral. To make it possible to use these irregular pieces of leather two or more of the edges are mortised as shown in Fig. 2, this being accomplished on a machine provided for this purpose which will cut into the edges dovetailed notches 11, all of the same size and shape, the material between said notches 11 forming projections 12 of the exact shape of said notches so that they may be fitted into the notches of any other piece of material as shown in Fig. 3 of the drawings.

While the notches 11 and projections 12 are shown dovetailed with straight sides it is obvious that any shape of interlocking projections and notches may be used equally as well provided the projection is of the same shape as the notch and the head of the projection is wider than the neck thereof.

Before interlocking the mortised edges of the various pieces of material as shown in Fig. 3 an adhesive is applied to said edges and when the pieces are interlocked the adhesive is permitted to set, thus uniting the pieces securely together.

Preferably before the pieces of material are mortised they are softened by immersing in a suitable bath and then permitted to dry. When the various pieces have been united as above described, they are subjected to roller pressure in a suitable machine for this purpose, thereby providing for a uniform thickness of the blank throughout. After the united pieces have been subjected to pressure and the surfaces are perfectly flat a thin facing 13 of material such as leather is secured to at least one face of said pieces, this facing preferably extending over the entire surface of all of the united pieces 10 and assisting in binding them together. The blank 14 thus formed is then again passed between rollers and subjected to pressure, after which taps, whole soles, half soles, or slip taps may be cut therefrom in the usual manner.

In Fig. 4 is shown a whole sole 15 cut from the blank 14 although it is self-evident that any shape may be cut from the blank to be used for a variety of purposes.

Owing to the interlocking of the various pieces 10 these pieces will not become separated when the soles or taps are bent in the manufacture of the shoe or when they are bent in the manufactured shoe.

It is believed that without further description the many advantages of the method will be fully understood.

Having thus described my invention, I claim:

1. The method of utilizing scrap pieces of leather comprising mortising the edges thereof with a plurality of recesses and projections of equal size and shape; applying adhesive to said mortised edges, then interlocking said edges, and then applying a thin layer of material over one entire face of said united pieces.

2. The method of utilizing scrap pieces of material comprising first softening said pieces, then drying them, then mortising the edges thereof, then applying adhesive to the mortised edges, then interlocking said mortised edges, and then applying roller pressure to said united pieces.

3. The method of utilizing scrap pieces of material comprising first softening said pieces, then drying them, then mortising the edges thereof, then applying adhesive to the mortised edges, then interlocking said mortised edges, then applying roller pressure to said united pieces, then applying over the united pieces a layer of facing material and subjecting the completed article to roller pressure.

4. The method of utilizing scrap pieces of material comprising first softening said pieces, then drying them, then mortising the edges thereof, then applying adhesive to the mortised edges, then interlocking said mortised edges, then applying roller pressure to said united pieces, then applying over the united pieces a layer of facing material and subjecting the completed article to roller pressure, and then cutting from the material a blank for use in the manufacture of shoes.

5. The method of utilizing scrap pieces of material having broad flat faces substantially parallel comprising mortising the edges thereof with a plurality of recesses and projections of equal size and shape with their walls parallel with each other and perpendicular to said broad flat faces; uniting said pieces by inserting edge projections of one piece in the recesses of another piece; and then applying a thin layer of material over one entire flat face of said united pieces.

6. The method of utilizing scrap pieces of leather having broad flat faces substantially parallel comprising mortising edges thereof with a plurality of recesses and projections of equal size and shape with their walls parallel with each other and perpendicular to said broad flat faces; and then uniting said pieces by inserting the edge projections of one piece in the recesses of another piece.

Signed by me at 4 Post Office Sq., Boston, Mass., this 2nd day of April, 1914.

EDWARD W. GERRISH.

Witnesses:
WALTER E. LOMBARD,
NATHAN C. LOMBARD.